United States Patent
Wiederin et al.

(10) Patent No.: US 11,406,973 B1
(45) Date of Patent: Aug. 9, 2022

(54) AUTOSAMPLER ARM WITH AUTOMATED PIPET SECURING AND UNSECURING

(71) Applicant: Elemental Scientific, Inc., Omaha, NE (US)

(72) Inventors: Daniel R. Wiederin, Omaha, NE (US); Jared Kaser, Lincoln, NE (US)

(73) Assignee: Elemental Scientific, Inc., Omaha, NE (US)

( * ) Notice: Subject to any disclaimer, the term of this patent is extended or adjusted under 35 U.S.C. 154(b) by 411 days.

(21) Appl. No.: 16/561,306

(22) Filed: Sep. 5, 2019

Related U.S. Application Data

(60) Provisional application No. 62/727,352, filed on Sep. 5, 2018.

(51) Int. Cl.
*B01L 3/02* (2006.01)

(52) U.S. Cl.
CPC .............. *B01L 3/0279* (2013.01); *B01L 3/021* (2013.01)

(58) Field of Classification Search
CPC .......... B01L 3/02; B01L 3/021; B01L 3/0279; B01L 3/0275; B01L 3/0255; B01L 3/0203; B01L 3/0224; B01L 3/0231; B01L 3/0234; B01L 3/10; B01L 3/0282; B01L 3/0286; B01L 3/0289; B01L 9/54; B01L 13/00; B01L 13/02; B01L 2200/00; B01L 2200/02; B01L 2200/021; B01L 2200/022; B01L 2200/023; B01L 2200/025; B01L 2200/04; B01L 2200/026; B01L 2200/027; B01L 2200/028

See application file for complete search history.

(56) References Cited

U.S. PATENT DOCUMENTS

| | | | |
|---|---|---|---|
| 2009/0074622 A1* | 3/2009 | Kalamakis | G06F 1/1626 422/400 |
| 2014/0170735 A1* | 6/2014 | Holmes | G01N 21/07 435/287.1 |
| 2016/0167041 A1* | 6/2016 | Curry | B01L 3/0275 422/526 |

* cited by examiner

*Primary Examiner* — John Fitzgerald
*Assistant Examiner* — Truong D Phan
(74) *Attorney, Agent, or Firm* — Kevin E. West; Advent, LLP

(57) ABSTRACT

A fluid handling assembly for selectively coupling and decoupling with a pipet tip can include a sampling arm, an arm cover, a probe carrier unit, a probe, and a biasing spring. The arm cover can be carried by the sampling arm. The probe carrier unit can be movably mounted within the arm cover, with the probe carrier unit including a probe release structure and a main probe carrier. The probe release structure and the main probe carrier can be interconnected. The probe can be carried by the main probe carrier and movable through a probe opening in the arm cover. The probe can be configured to releasably carry a pipet tip. The biasing spring can be carried within the arm cover and can contact the probe release structure. The biasing spring can bias the probe release structure to push the probe down toward the probe opening in the arm cover.

17 Claims, 7 Drawing Sheets

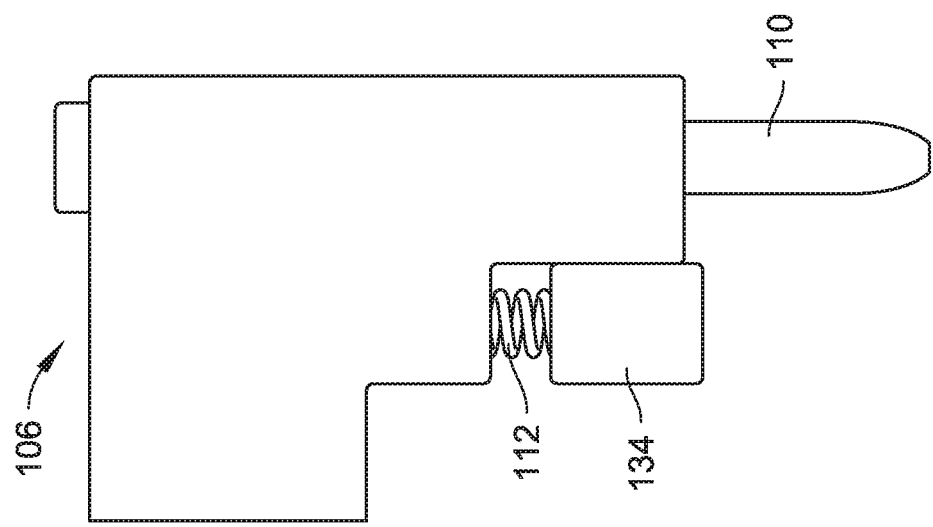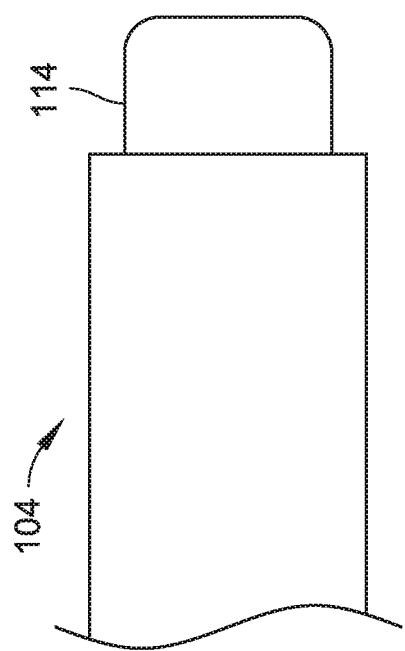
FIG. 3

AUTOSAMPLER ARM WITH AUTOMATED PIPET SECURING AND UNSECURING

BACKGROUND

Liquid samples can be placed in sample vials or containers for access by an autosampler probe to introduce the samples to a sample preparation system or analysis system. Multiple sample vials or containers can be made available to the autosampler probe, such as through a sample rack holding multiple vials or containers. Sample introduction systems may be employed, for example, to introduce the liquid samples into ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation.

Automatic sampling systems (e.g., autosamplers) can facilitate sampling of many different samples from vials positioned adjacent a sample probe. The sample probe can be rinsed between taking different samples, to reduce the likelihood of cross-contamination between samples. However, for certain samples, such as various biological samples, rinsing a sample probe between samples may be insufficient to mitigate or prevent cross-contamination.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to a fluid handling assembly for selectively coupling and decoupling with a pipet tip can include a sampling arm, an arm cover, a probe carrier unit, a probe, and a biasing spring. The arm cover can be carried by the sampling arm. The probe carrier unit can be movably mounted within the arm cover, with the probe carrier unit including a probe release structure and a main probe carrier. The probe release structure and the main probe carrier can be interconnected. The probe can be carried by the main probe carrier and movable through a probe opening in the arm cover. The probe can be configured to releasably carry a pipet tip thereon. The biasing spring can be carried within the arm cover and can contact the probe release structure. The biasing spring can be configured to bias the probe release structure to push the probe down toward the probe opening in the arm cover.

DRAWINGS

The Detailed Description is described with reference to the accompanying figures.

FIG. 3 is a side, isometric, exploded, and partially cut-away view of the fluid handling assembly shown in FIGS. 1 and 2.

DETAILED DESCRIPTION

Overview

Figure 1:
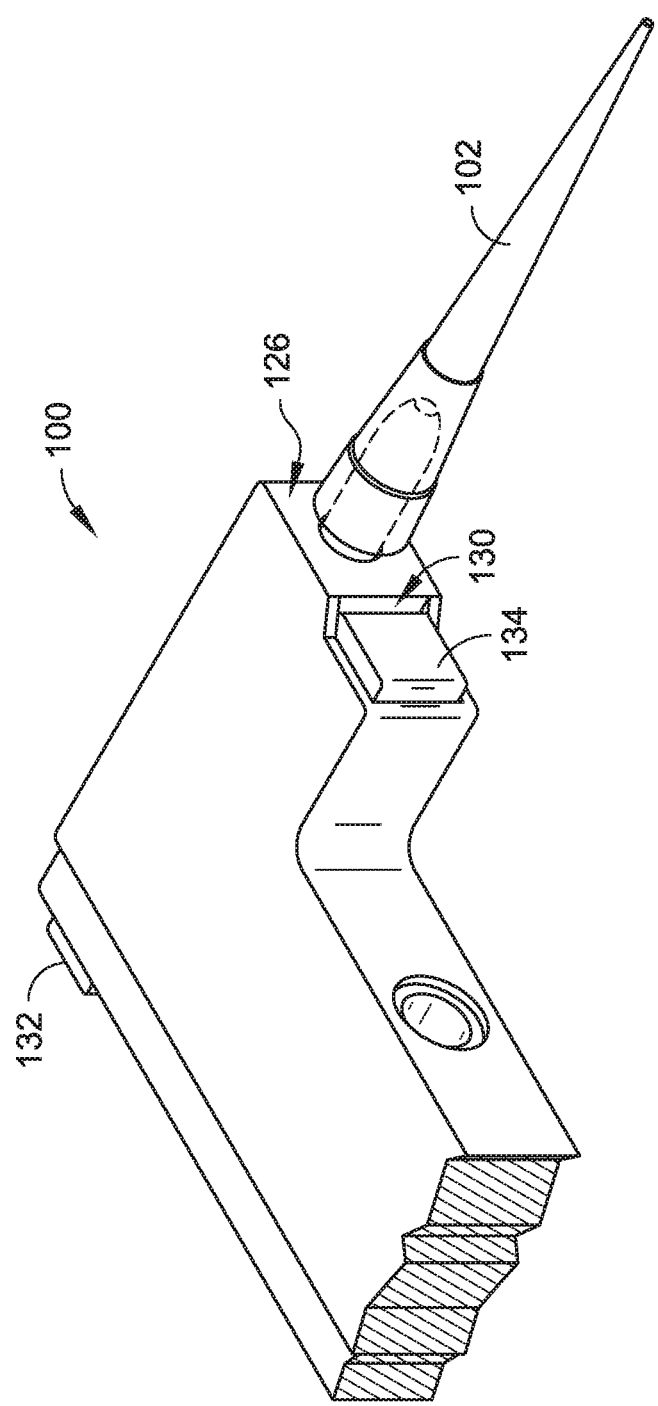
FIG. 1 is a front, isometric view of a fluid handling assembly with automatic pipet tip coupling and decoupling, shown carrying a pipet tip, in accordance with an example embodiment of the present disclosure.

A fluid handling system, which can be part of an autosampler, with automatic pipet tip coupling and decoupling is provided. The fluid handling system can automatically introduce a pipet tip (e.g., a disposable pipet tip) onto a probe of the fluid handling assembly to draw a sample from a sample vial into the pipet tip for introduction into a sample preparation system. For instance, the probe can be coupled to a fluid line, where a pump can be in fluid communication, via the fluid line, with the pipet tip coupled to the probe. To introduce the pipet tip to the probe, the fluid handling system can direct a sampling arm to position the probe above a pipet tip, and then lower the probe into an interior of the pipet tip. During insertion of the probe within the pipet tip, the pipet tip can push against the probe to form a friction fit therewith.

Following handling of the sample (e.g., introduction to a sample preparation system via the fluid line, introduction to a different sample vial via the sample probe, etc.), the fluid handling assembly can direct the pipet tip to a removal station for automatic removal of the pipet tip. The probe can be coupled to a probe support for the probe, and a release structure can be coupled to the probe support. Movement (e.g., slidable movement) of the release structure thus promotes concordant movement of the probe. At the removal station, the release structure can be engaged to move upwardly toward the main body of the fluid handling assembly, causing the probe to move upwardly, as well. The upward movement of the probe can cause the top of the pipet tip to engage the bottom of the fluid handling assembly, pushing the pipet tip off the probe and into a collection area of the removal station. The present fluid handling assembly may be used, for example, in applications where the pipet tip may include a resin therein to separate sample components (e.g., biological components) and/or where simple rinsing may be insufficient to fully clean the pipet tip. The removal station may serve as a disposal station or as an extended cleaning station.

Example Implementations

FIGS. 1-5 generally illustrate a fluid handling assembly 100, which may be part of an autosampler assembly or other fluid delivery device, configured to automatically couple and decouple a pipet tip 102, according to an example embodiment of the present disclosure, and to allow for sampling and delivery of fluids via such pipet tips 102. The fluid handling assembly 100 can include a sampling arm 104 (which may be considered a probe arm; and/or an autosampler arm, when specifically part of an autosampler), an arm cover 106, a probe carrier unit 108, a probe 110, and a carrier-biasing spring 112. The sampling arm 104 can define a distal arm tab 114 and an arm mount hole 116. The arm cover 106 can define a tab-receiving slot 118, a spring-receiving channel 120, a first carrier-receiving channel 122, and a second carrier-receiving channel 124. The spring-receiving channel 120 and the first carrier-receiver channel 122 may be located between the tab-receiving slot 118 and the second carrier-receiving channel 124. The spring-receiving channel 120 and the first carrier-receiver channel 122 may further be vertically co-aligned with one another. The arm cover 106 can further define a cover bottom 126 facing away from the sampling arm 104 and can generally define a probe opening 128 and a probe-release opening 130 in the cover bottom 126. The probe carrier unit 108 can include a main probe carrier 132 and a probe release block 134, offset from yet coupled with the main probe carrier 132. The sampling arm 104, the arm cover 106, the probe carrier unit 108, the probe 110, and the carrier-biasing spring 112 can together be considered to a probe-based assembly.

The arm cover 106 can mount to the sampling arm 104, with the distal arm tab 114 fitting into the tab-receiving slot 118 of the arm cover 106. Those portions may remain removably attached (e.g., slidable or friction-fit connection) or may be permanently attached (e.g., via an adhesive or a plastic welding procedure) relative to one another. The arm cover 106 can house the carrier-biasing spring 112 (e.g., a coil spring), via the spring-receiving channel 120, with the carrier-biasing spring 112 biasing against the arm cover 106 and the probe release block 134 of the probe carrier unit 108. In embodiments, the vertical alignment of the spring-receiving channel 120 and the first carrier-receiver channel 122 can help ensure efficient transfer of force (e.g., essentially a single, vertical force vector) from the carrier-biasing spring 112 and the probe release block 134. The arm cover 106 can further house and carry the probe carrier unit 108 (e.g., within the second carrier-receiving channel 124), with the probe carrier unit 108 configured to slidably move within the arm cover 106. In an embodiment, the second carrier-receiving channel 124 can be offset from the first carrier-receiving channel 124 and/or the spring-receiving channel 120 and, in particular, may be parallel thereto (e.g., for efficient transfer of energy). The probe release block 134 of the probe carrier unit 108 can travel within the first carrier-receiver channel 122 and can be co-molded with or otherwise attached to the main probe carrier 132 (e.g., the attachment can be separate or integral). By being attached, actuation of the probe release block 134 can simultaneously induce movement of the main probe carrier 132 in a like direction.

Figure 2:
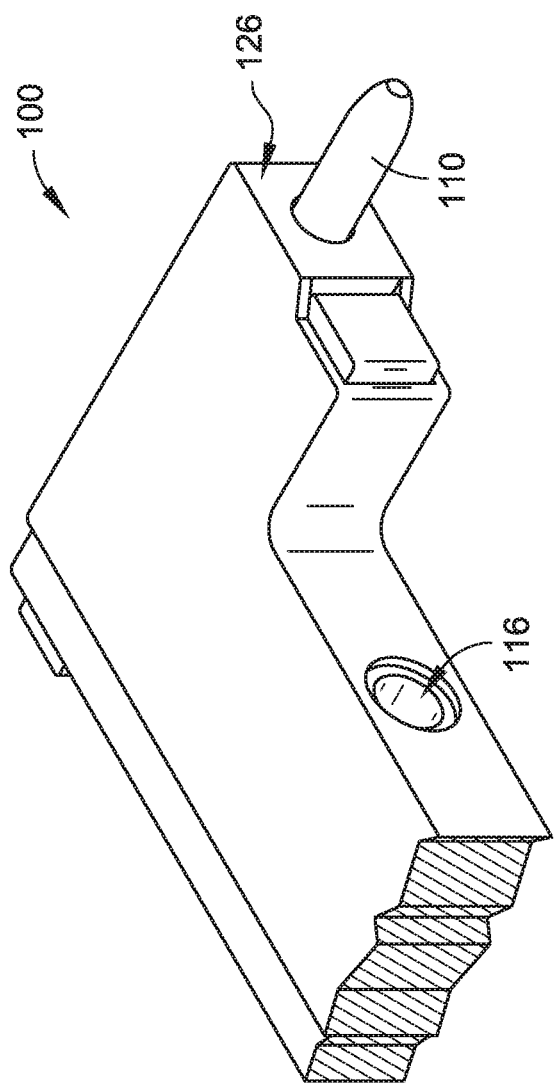
FIG. 2 is a front, isometric view of the fluid handling assembly shown in FIG. 1, without a pipet tip being carried thereby.
Figure 4:
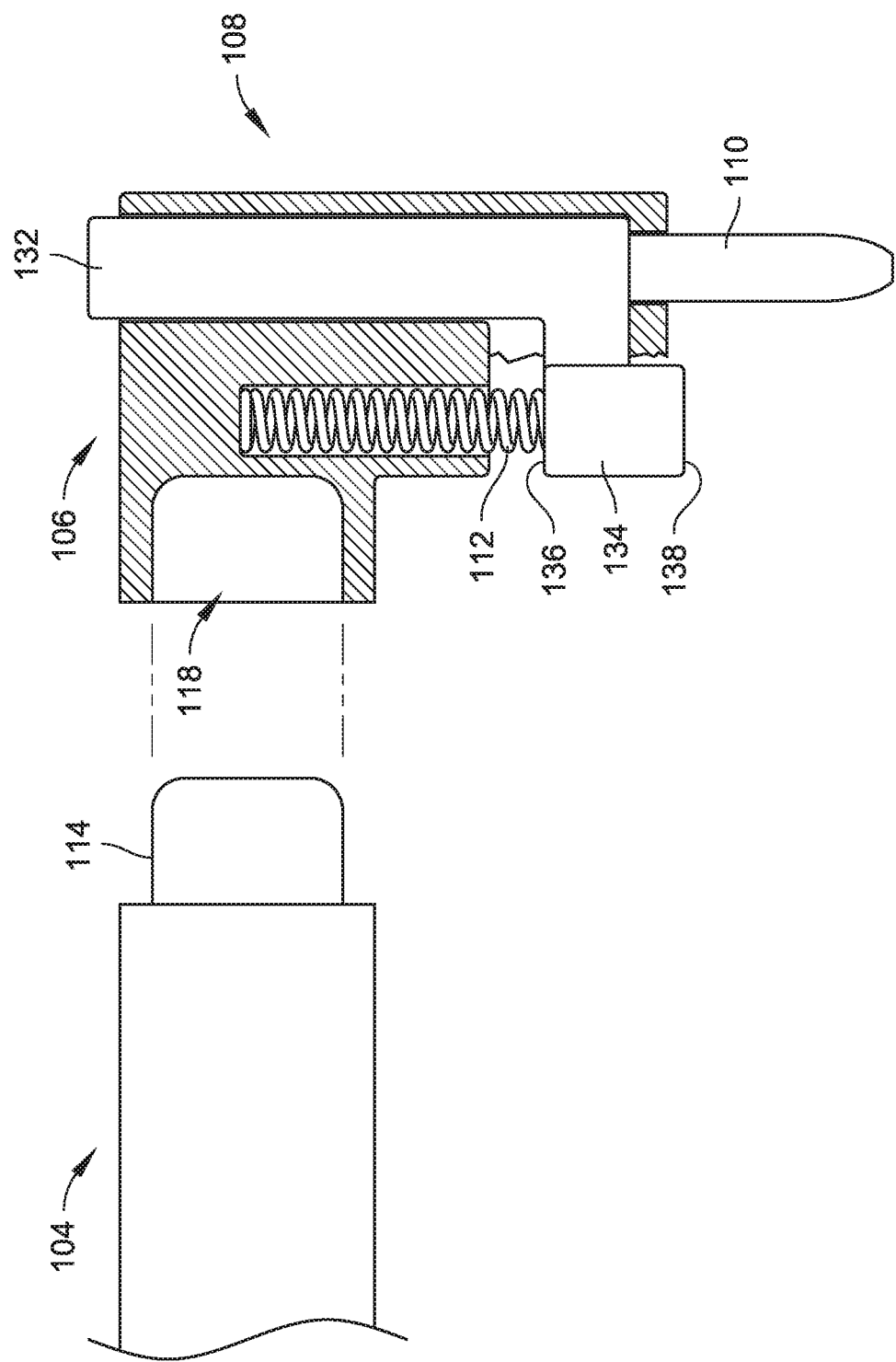
FIG. 4 is a side, isometric, exploded, and further cut-away view of the fluid handling assembly shown in FIG. 3.
Figure 5:
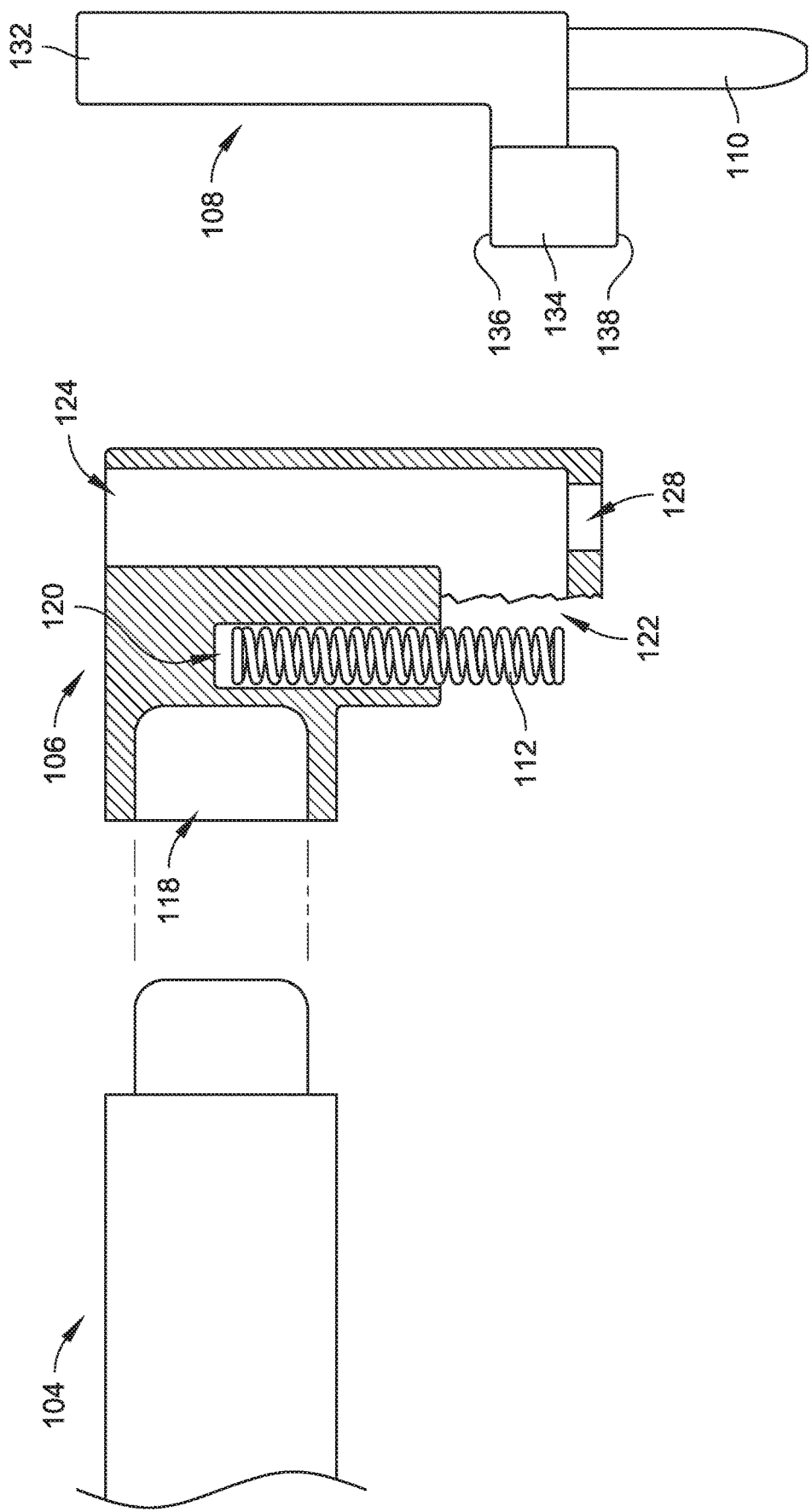
FIG. 5 is side, fully-exploded view of the fluid handling assembly shown in FIG. 4.

The probe release block 134 can define an upper block face 136 and a lower block face 138. The carrier-biasing spring 112 can be biased toward the upper block face 136, while the lower block face 138 can be directed toward the probe-release opening 130 in the cover bottom 126. The lower block face 138 can have an area less than the probe-release opening 130 and may protrude slightly from the probe-release opening 130 (e.g., as seen in FIGS. 1 and 2) under normal bias of the probe release block 134 by the carrier-biasing spring 112 (i.e., no counter force against the probe release block 134). In an embodiment, the carrier-biasing spring 112 can engage the upper block face 136. Alternatively, one or both ends of the carrier-spring 112 may carry an engagement member (not shown) for engaging with the upper block face 136 or the probe-release opening 130, respectively, e.g., to reduce wear induced by a spring end and/or to evenly distribute the engagement force.

The probe 110 can be carried (e.g., attached to or co-molded with) by the main probe carrier 132 of the probe carrier unit 108. The probe 110 can be configured to releasably carry and otherwise transport a pipet tip 102 (e.g., via a friction fit). The probe 110 can travel through the probe opening 128 of the cover bottom 126, as dictated by movement of the main probe carrier 132. The probe 110 and the main probe carrier 132 may define a fluid flow path therebetween (not shown), as needed for sample delivery. The main probe carrier 132 can travel within the second carrier-receiving channel 124, as dictated by the movement of the probe release block 134. The main probe carrier 132 may extend out of the second carrier-receiving channel 124 (i.e., above the arm cover 106) upon upward movement of the probe release block 134, but the downward travel path thereof can be limited by the probe opening 128 in the cover bottom 126 (i.e., the second carrier-receiving channel 124 being greater in cross section than the probe opening 128). Particularly, the probe opening 128 is sized such that the probe 110 can extend or otherwise fit therethrough but the main probe carrier 132 cannot (i.e., the surrounding cover bottom 126 acting as a travel stop for the probe release block 134).

Figure 6A:
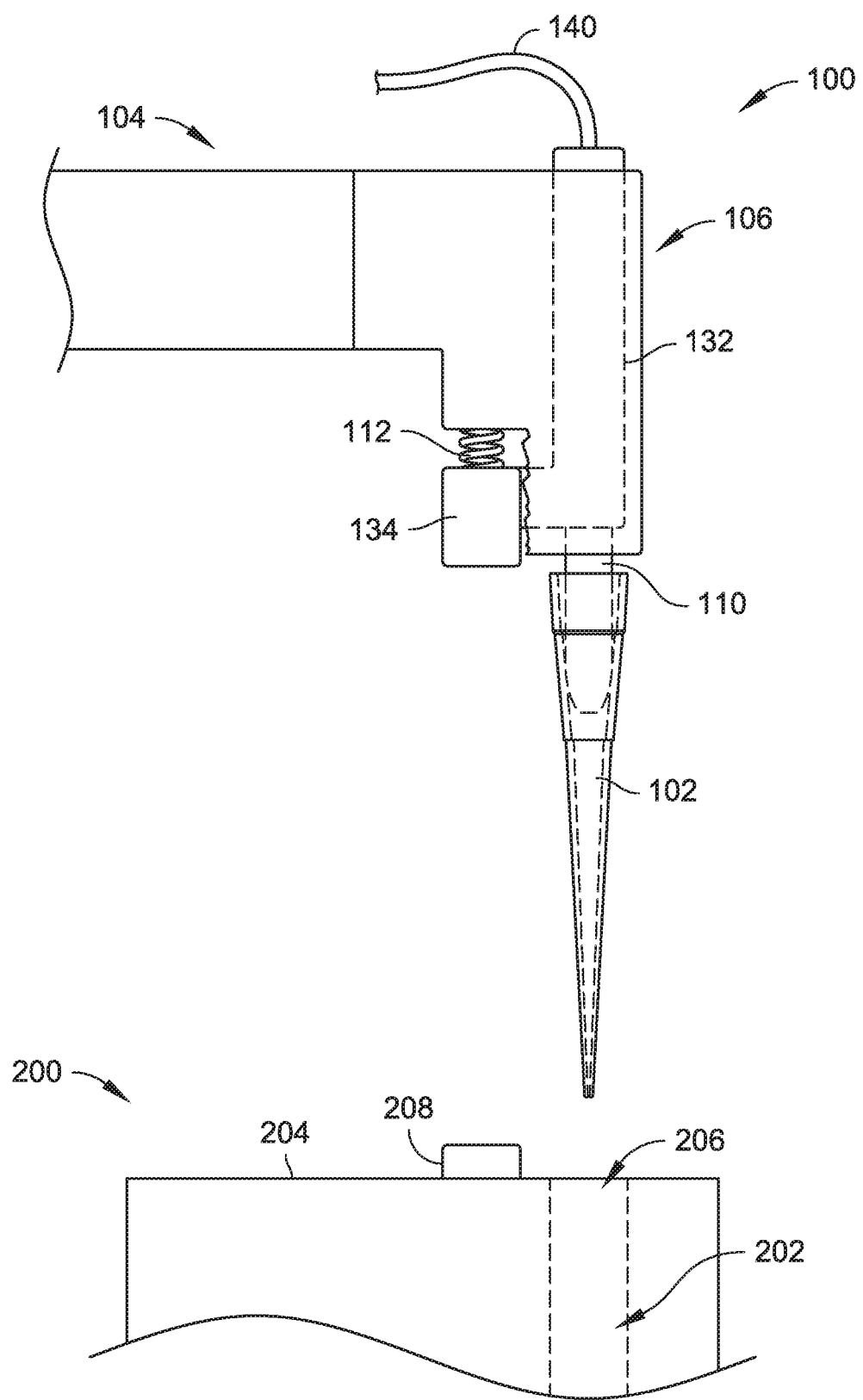
FIG. 6A is a side, schematic view of a fluid handling assembly used in conjunction with a removal station, prior to release of a pipet tip, in accordance with an example embodiment of the present disclosure.
Figure 6B:
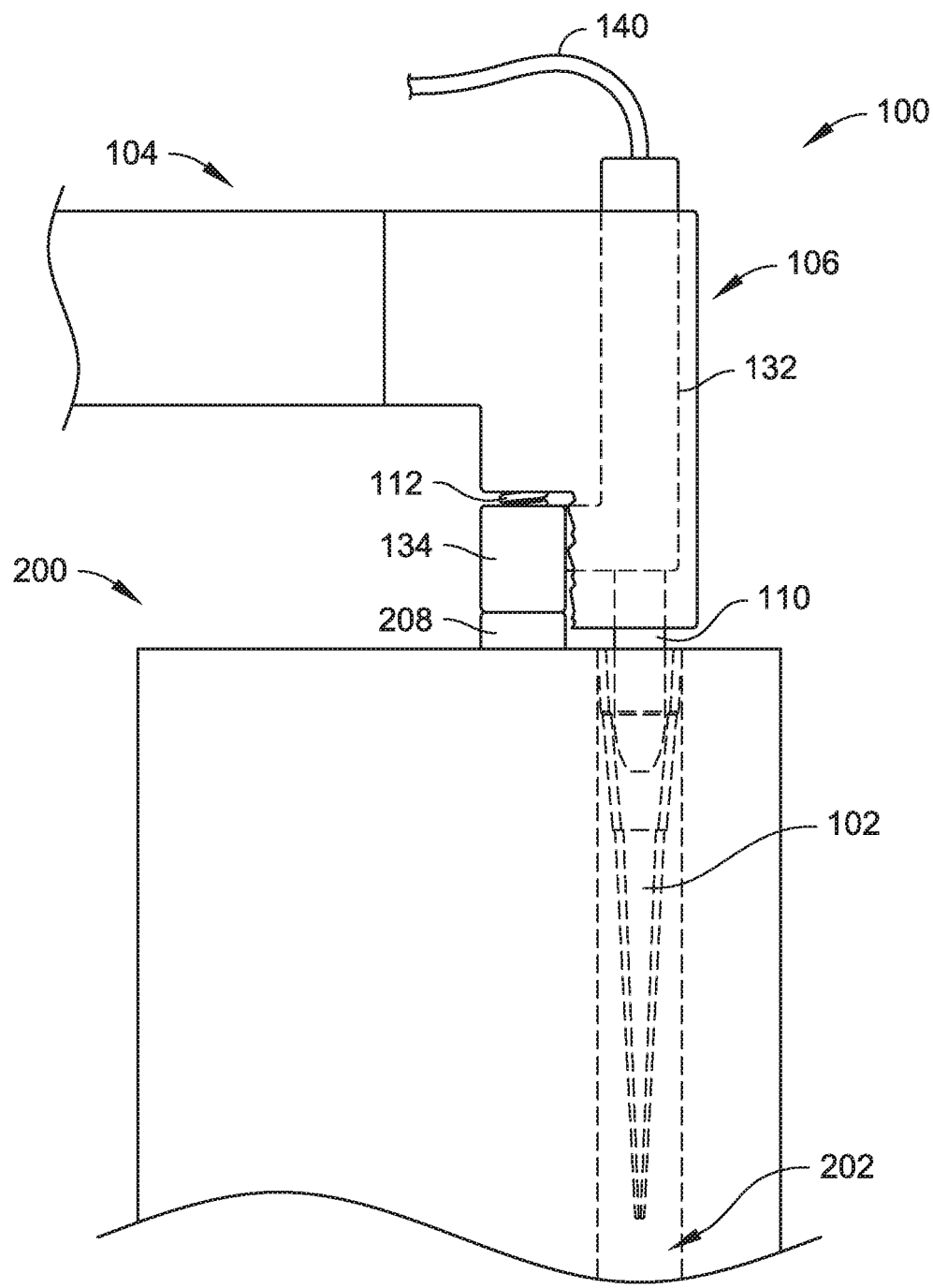
FIG. 6B is a side, schematic view of a fluid handling assembly used in conjunction with a removal station, as shown in FIG. 6A, in the process of releasing of a pipet tip.

FIGS. 6A and 6B schematically illustrate the fluid handling assembly 100 in use with a removal station 200, in accordance with an embodiment of the present disclosure. The removal station 200 may be a modified rinse station, permitting for an extended cleaning or rinsing of the used pipet tips 102, or may be a disposal station for the used pipet tips 102. The removal station 200 can define a pipet collection area 202 therein (e.g., an aperture and/or an open collection space) configured to receive one or more pipet tips 102 (e.g., used pipet tips 102). The pipet collection area 202 may be configured, for example, as a disposal bin or as a rinse or wash station. The removal station 200 can define a removal station top surface 204, configured to face the fluid handling assembly 100 when the fluid handling assembly 100 is moved into position relative to the removal station 200. The removal station top surface 204 can define a collection opening 206 through which a pipet tip 102 may fit and thereby access the pipet collection area 202.

The removal station top surface 204 can further have a probe-release protrusion 208 attached thereto and extending upwardly therefrom. The probe-release protrusion 208 can be located proximate the collection opening 206 and can be configured to engage with the probe release block 134 upon lowering of the fluid handling assembly 100 toward the removal station 200, with the probe 110 and the related pipet tip 102 correspondingly aligning with the collection opening 206. The engagement of the probe-release protrusion 208 with the probe release block 134 can cause the probe release block 134 to slidably move upwardly within the first carrier-receiver channel 122, overcoming the force of the carrier-biasing spring 112. By its interconnectivity, that upward movement of the probe release block 134 can promote a similar upward motion of the main probe carrier 132 (e.g., sliding within the second carrier-receiving channel 124), pulling the probe 110 up (e.g., at least partially) through the probe opening 128. That combination of motion can promote the release of the pipet tip 102 from the probe 110, allowing the pipet tip 102 to drop through the collection opening 206 of the removal station 200 and into the pipet collection area 202. In an embodiment, the release of the pipet 102 may be prompted by the engagement of the top of the pipet 102 with the cover bottom 126 of the arm cover 106, as the probe 110 withdraws through the probe opening 128 and into the second carrier-receiving channel 124.

During insertion of the probe 110 within the pipet tip 102, the pipet tip 102 can push against the probe 110 to create a friction fit. The probe 110 can travel into the pipet tip 102, where the top of the pipet tip 102 can be positioned adjacent the cover bottom 126 of the arm cover 106. The cover bottom 126 of the arm cover 106 can stop the motion of the pipet tip 102, which, in turn, is able to stop a vertical motion of the probe 110 (e.g., does not allow the probe 110 to enter into the arm cover 106 any further). If the probe 110 entered too far into the arm cover 106, the top of the pipet tip 102 may be pushed against the cover bottom 126 of the arm cover 106, possibly popping the pipet tip 102 off the fluid handling assembly 100. As such, the arm cover 106 can be structured to keep the probe 110 substantially stationary with respect to the arm cover 106 during insertion into the pipet tip 102 (or at least structured to control the range of motion of the probe 110 with respect to the arm cover 106 to prevent removal of the pipet tip 102 through contact between the pipet tip 102 and the arm cover 106). Essentially, the biasing action of the carrier-biasing spring 112 against the probe release block 134 can tend to force the probe 110 toward the probe opening 128 during the pipet tip loading stage, counteracting, at least in part, any tendency of the probe 110 to want to move upwardly during such stage.

During engagement of the fluid handling assembly 100 with the removal station 200, the probe-release protrusion 208 can interact with the probe release block 134 (i.e., a release structure of the probe carrier unit 108) that can cause the probe 110 to lift into an arm cover 106 of the fluid handling assembly 100. The probe release block 134 can be in contact with the carrier-biasing spring 112 housed within the arm cover 106. The tension provided by the carrier-biasing spring 112 can be overcome when the probe-release protrusion 208 is pushed against the probe release block 134, allowing the probe release block 134 to travel vertically upwardly with respect to the arm cover 106. The vertical movement of the probe release block 134 with respect to the arm cover 106 can cause, by extension, the probe 110 to travel vertically into the arm cover 106. The force of the interaction between the top of the pipet tip 102 and the cover bottom 126 of the arm cover 106 can then push the pipet tip 102 off the probe 110 and into the pipet collection area 202.

In the embodiment shown in FIGS. 6A and 6B, the fluid handling assembly 100 may be further provided with a fluid line 140. The fluid line 140, via fluid communication through the main probe carrier 132 and the probe 110, can facilitate delivery of a sample and/or other fluids to/from a given pipet tip 102, as needed. The fluid handling assembly 100 may further include a pump (not shown), to facilitate such delivery.

The fluid handling assembly 100, including some or all of its components, can operate under computer control. For example, a processor (not shown) can be included with or in the fluid handling assembly 100 to control the components and functions of the fluid handling assembly 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the fluid handling assembly 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A processor can provide processing functionality for the fluid handling assembly 100 and can include any number of processors, micro-controllers, or other processing systems, and resident or external memory for storing data and other information accessed or generated by the fluid handling assembly 100. The processor can execute one or more software programs that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The control system for the fluid handling assembly 100, as needed, can also include a memory. The memory is an example of tangible, computer-readable storage medium that provides storage functionality to store various data associated with operation of the fluid handling assembly 100, such as software programs and/or code segments, or other data to instruct the processor, and possibly other components of the fluid handling assembly 100, to perform the functionality described herein. Thus, the memory can store data, such as a program of instructions for operating the fluid handling assembly 100 (including its components), and so forth. It is noted that while a single memory is described, a wide variety of types and combinations of memory (e.g., tangible, non-transitory memory) can be employed. The memory can be integral with the processor, can comprise stand-alone memory, or can be a combination of both. The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory can include removable integrated circuit card (ICC) memory, such as memory provided by a subscriber identity module (SIM) card, a universal subscriber identity module (USIM) card, a universal integrated circuit card (UICC), and so on.

The control system for the fluid handling assembly 100 can further include a communications interface. The communications interface is operatively configured to communicate with components of the system. For example, the communications interface can be configured to transmit data for storage in the system, retrieve data from storage in the system, and so forth. The communications interface is also communicatively coupled with the processor to facilitate data transfer between components of the system and the processor (e.g., for communicating inputs to the processor received from a device communicatively coupled with the system and/or communicating output to a device communicatively coupled with the system. It is noted that while the communications interface is described as a component of a system, one or more components of the communications interface can be implemented as external components communicatively coupled to the system via a wired and/or wireless connection. The system can also comprise and/or connect to one or more input/output (I/O) devices (e.g., via the communications interface) including, but not necessarily limited to: a display, a mouse, and so on. The communications interface and/or the processor can be configured to communicate with a variety of different networks (e.g., wireless and/or wired).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fluid handling assembly for selectively coupling and decoupling with a pipet tip, the fluid handling assembly comprising:
   a sampling arm;
   an arm cover carried by the sampling arm;
   a probe carrier unit movably mounted within the arm cover, the probe carrier unit including a probe release structure and a main probe carrier, the probe release structure and the main probe carrier being interconnected;
   a probe carried by the main probe carrier, the probe configured to releasably carry a pipet tip thereon, the arm cover defining a probe opening therethrough, the probe movable through the probe opening in the arm cover; and
   a biasing spring carried within the arm cover, the biasing spring configured to bias the probe release structure and, through the interconnection of the probe release structure to the main probe carrier, to push the probe at least one of toward or through the probe opening in the arm cover,
   wherein the probe release structure is in the form of a probe release block, the probe release block defining an upper block face and an opposed lower block face, the biasing spring biased toward the upper block face, the lower block face configured to engage a probe-release element associated with a pipet-tip removal station.

2. The fluid handling assembly of claim 1, wherein the biasing spring contacts the probe release structure.

3. The fluid handling assembly of claim 1, wherein the probe opening in the arm cover is sized such that the probe can fit therethrough but the main probe carrier cannot.

4. The fluid handling assembly of claim 1, further in combination with a removal station for receiving one or more pipet tips.

5. The fluid handling assembly of claim 4, wherein the removal station defines a pipet collection area therein, the pipet collection area configured to receive one or more pipet tips upon release from the probe.

6. The fluid handling assembly of claim 4, wherein the removal station is one of a tip disposal station or a tip cleaning station.

7. The fluid handling assembly of claim 1, wherein the arm cover defines a spring receiving channel and a first carrier channel, the spring receiving channel configured to carry the biasing spring therein, the first carrier channel configured to carry the probe release structure therein, the probe release structure configured to travel in the first carrier channel.

8. The fluid handling assembly of claim 7, wherein the spring receiving channel and the first carrier channel are co-aligned.

9. The fluid handling assembly of claim 7, wherein the arm cover further defines a second carrier channel distinct from the first carrier channel, the second carrier channel configured to carry the main probe carrier, the main probe carrier configured to travel in the second carrier channel.

10. The fluid handling assembly of claim 9, wherein the second carrier channel is offset from the first carrier channel.

11. The fluid handling assembly of claim 10, wherein the second carrier channel is parallel to the first carrier channel.

12. A fluid handling assembly for selectively coupling and decoupling with a pipet tip, the fluid handling assembly comprising:
    a sampling arm;
    an arm cover carried by the sampling arm;
    a probe carrier unit movably mounted within the arm cover, the probe carrier unit including a probe release structure and a main probe carrier, the probe release structure and the main probe carrier being interconnected;
    a probe carried by the main probe carrier, the probe configured to releasably carry a pipet tip thereon, the arm cover defining a probe opening therethrough, the probe movable through the probe opening in the arm cover;
    a biasing spring carried within the arm cover, the biasing spring configured to bias the probe release structure and, through the interconnection of the probe release structure to the main probe carrier, to push the probe at least one of toward or through the probe opening in the arm cover; and
    a removal station for receiving one or more pipet tips, wherein the removal station includes a protrusion configured to impact the probe release structure upon movement of the fluid handling assembly into place relative to the removal station, the impact of the probe release structure configured to promote upward movement of the probe release structure and the main probe carrier within the arm cover.

13. A probe-based assembly for selectively coupling and decoupling with a pipet tip, the probe-based assembly comprising:
    an arm cover configured to be carried by an sampling arm;
    a probe carrier unit movably mounted within the arm cover, the probe carrier unit including a probe release structure and a main probe carrier, the probe release structure and the main probe carrier being interconnected;
    a probe carried by the main probe carrier, the probe configured to releasably carry a pipet tip thereon, the arm cover defining a probe opening therethrough, the probe movable through the probe opening in the arm cover; and
    a biasing spring carried within the arm cover, the biasing spring configured to bias the probe release structure and, through the interconnection of the probe release structure to the main probe carrier, to push the probe at least one of toward or through the probe opening in the arm cover,
    wherein the probe release structure is in the form of a probe release block, the probe release block defining an upper block face and an opposed lower block face, the biasing spring biased toward the upper block face, the lower block face configured to engage a probe-release element associated with a pipet-tip removal station.

14. The probe-based assembly of claim 13, wherein the probe opening in the arm cover is sized such that the probe can fit therethrough but the main probe carrier cannot.

15. The probe-based assembly of claim 13, wherein the arm cover defines a spring receiving channel and a first carrier channel, the spring receiving channel configured to carry the biasing spring therein, the first carrier channel configured to carry the probe release structure therein, the probe release structure configured to travel in the first carrier channel.

16. The probe-based assembly of claim 15, wherein the arm cover further defines a second carrier channel distinct from the first carrier channel, the second carrier channel configured to carry the main probe carrier, the main probe carrier configured to travel in the second carrier channel.

17. The probe-based assembly of claim 16, wherein the second carrier channel is parallel to the first carrier channel.

\* \* \* \* \*